United States Patent [19]

Vrba

[11] 4,095,265

[45] June 13, 1978

[54] MEMORY CONTROL STRUCTURE FOR A PIPELINED MINI-PROCESSOR SYSTEM

[75] Inventor: Richard Alan Vrba, Austin, Tex.

[73] Assignee: International Business Machines Corporation, Armonk, N.Y.

[21] Appl. No.: 693,816

[22] Filed: Jun. 7, 1976

[51] Int. Cl.² ............................ G06F 13/00; G11C 7/00
[52] U.S. Cl. ................................................ 364/200
[58] Field of Search .......... 340/172.5, 173 R, 173 SP; 445/1; 364/200 MS File, 900 MS File

[56] References Cited

U.S. PATENT DOCUMENTS

| | | | |
|---|---|---|---|
| 3,535,560 | 10/1970 | Cliff | 364/200 X |
| 3,641,328 | 2/1972 | Osborne | 364/900 X |
| 3,659,275 | 4/1972 | Marshall | 340/172.5 X |
| 3,688,280 | 8/1972 | Ayling et al. | 340/173 R X |
| 3,748,653 | 7/1973 | Debruyne et al. | 340/173 R X |
| 3,753,232 | 8/1973 | Sporer | 364/200 |
| 3,753,242 | 8/1973 | Townsend | 340/172.5 |
| 3,793,631 | 2/1974 | Silverstein et al. | 340/172.5 |
| 3,803,554 | 4/1974 | Bock et al. | 340/173 R X |
| 3,806,880 | 4/1974 | Spence | 340/172.5 |
| 3,813,649 | 5/1974 | Struger et al. | 340/172.5 |
| 3,821,715 | 6/1974 | Hoff, Jr. et al. | 340/172.5 |
| 3,832,694 | 8/1974 | Judith | 340/172.5 |
| 3,900,836 | 8/1975 | Salvo | 364/200 |
| 3,911,424 | 10/1975 | Giannuzzi et al. | 340/172.5 X |
| 3,943,495 | 3/1976 | Garlic | 340/172.5 |
| 3,959,783 | 5/1976 | Fressineau et al. | 340/172.5 X |
| 3,969,724 | 7/1976 | Anderson et al. | 364/200 |
| 3,972,028 | 7/1976 | Weber et al. | 364/200 |
| 3,974,479 | 8/1976 | Kotok et al. | 364/200 |
| 3,983,544 | 9/1976 | Dennison et al. | 340/173 R |
| 4,025,771 | 5/1977 | Lynch, Jr. et al. | 364/200 X |

*Primary Examiner*—Melvin B. Chapnick
*Attorney, Agent, or Firm*—John W. Henderson, Jr.

[57] ABSTRACT

A memory control structure for a pipe-lined mini-processor which allows the processor to work with relatively slow memories without degradation of performance. The memory structure includes a memory selector which provides an interface between the processor output and the inputs of a plurality of memories of different types and speeds. The memory selector receives address and control information from the processor and generates the timing and selection signals for the memories. The memory structure also includes fan-in circuitry connected to the outputs of all the memories. The fan-in circuitry includes latches for sampling the output of each memory and multiplexing the memory outputs onto a single data bus for transfer of data from the memories to the processor.

5 Claims, 8 Drawing Figures

MEMORY CONTROL STRUCTURE FOR A PIPELINED MINI-PROCESSOR SYSTEM

BACKGROUND OF THE INVENTION

1. Field of the Invention

The present invention relates to logic for interfacing between a processor and a plurality of memories having different operating and timing characteristics.

2. Prior Art

It is known in the prior art to provide a single interface controller for a plurality of peripheral devices such as storage devices and input/output devices. However, prior art interface controllers are limited to the selection of devices of the same type each of which contains its own timing generator. The controller thus acts as a peripheral processor, interpreting instructions from the central processor and selecting the desired one of the plurality of devices under its control. This type of control system is wasteful of circuitry in that timing and control circuits must be duplicated for each device.

OBJECTS OF THE INVENTION

It is a primary object of the present invention to improve access control between a processor and a plurality of different memory devices.

It is another object of the present invention to reduce memory power consumption.

It is a further object of the present invention to reduce the amount of control circuitry necessary to run a plurality of different memories.

SUMMARY OF THE INVENTION

These and other objects of the invention are accomplished by providing memory control circuitry which interfaces between the central processing unit and Random Access and Read Only memories. The memory control circuitry includes selection circuitry and fan-in circuitry. The memory selection circuitry receives signals from the processor indicating whether RAM or ROS is to be selected and the address to be accessed. The selection circuitry then generates selection signals to the proper memory and generates timing signals of the proper timing to run the memory selected. The fan-in circuitry is controlled by the selection circuitry and includes a multiplexor to sample data from each of the memories onto a single output data bus to the processor. Fan-in also includes latches to hold the data for a cycle equal to the processor's cycle where the memory operates at a faster cycle time than the processor.

DESCRIPTION OF THE PREFERRED EMBODIMENT

Figure 1:
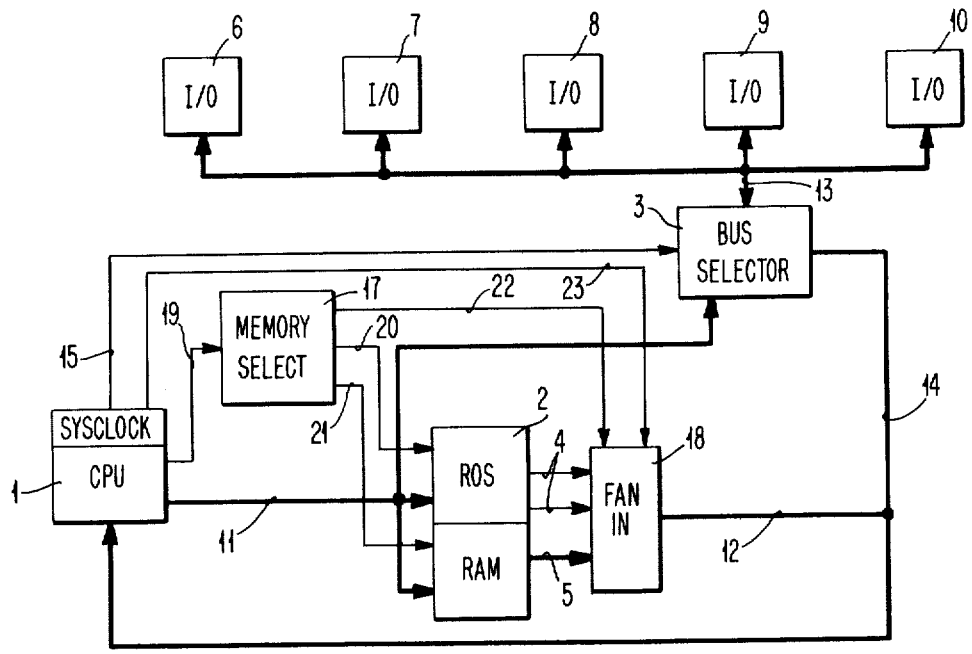
FIG. 1 is an overall diagram of a word processing system including the memory structure of this invention.

Referring to FIG. 1, a block diagram of a word processing system is shown. The system comprises a Central Processing Unit (CPU) 1 including a processor and system clock. The output of the CPU 1 is connected to data bus 11 which communicates with a random access memory section of memory unit 2 and with a bus selector 3. A detailed description of the bus selector is given in copending application Ser. No. 693,821, filed June 7, 1976, by W. C. Cockerill, et al., entitled "Bus Steering Structure for Low Cost Pipelined Processor System", now U.S. Pat. No. 4,057,846, issued Nov. 8, 1977, and assigned to the same assignee as the present invention. It is the function of the bus selector 3 to logically and electrically isolate the I/O devices 6-10 attached to bus 13 from the rest of the system during system operations which do not use those I/O units and to provide a data path between I/O units 6-10 and the processor for operation which access those I/O units. The bus selector 3 is controlled by the CPU 1 through control bus 15.

The system further includes a memory select 17 which receives control and timing signals from the CPU 1 on control bus 19. The output of the memory select is connected to a Random Access memory (RAM) by control line 21, to the read only storage (ROS) section of memory 2 by control line 20 and to the fan-in control 18 through line 22. It is the function of the memory select 17 to decode control and general timing signals from the CPU 1 to generate the required selection and timing signals for either the ROS or RAM section of the memory 2. During the period when the memories are not in use, only a minimum power level is used by the memory thereby reducing power consumption.

The output of RAM memory is connected to fan-in 18 through data bus 5 and the output of ROS memory is connected to fan-in 18 through data bus 4. Fan-in 18 receives control signals from the CPU 1 through control line 23 and from memory select 17 through control line 22. It is the function of fan-in 18 to multiplex data output from the RAM and the ROS onto a single output bus 12 which is connected to the processor data-in bus 14. Fan-in also provides a latching function for holding memory output data true for the time required by the processor where the memories operate at a higher data rate then the processor.

Figure 2:
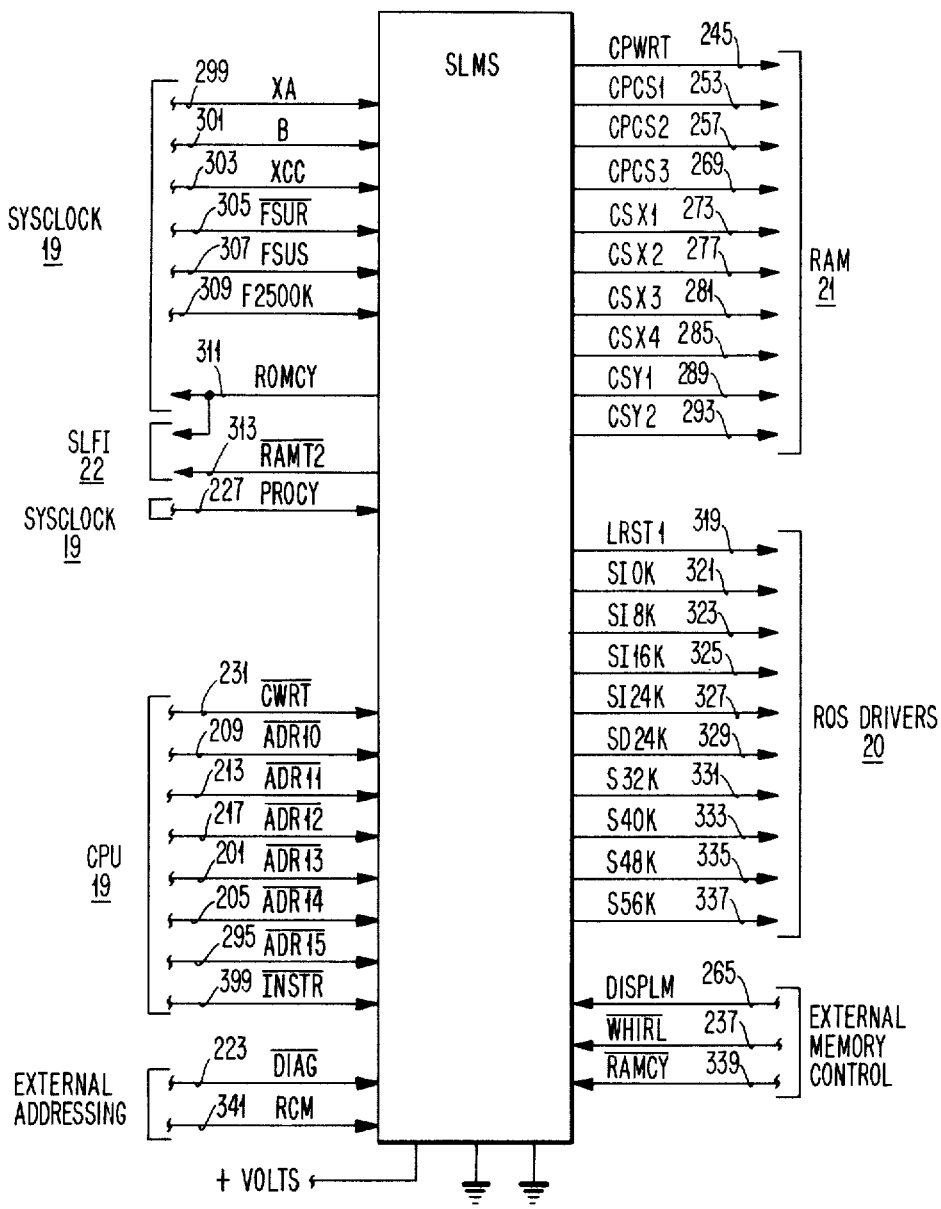
FIG. 2 is a block diagram of the memory select portion of the invention showing its inputs and outputs in detail.

Referring now to FIG. 2, a more detailed drawing of the memory select 17 is shown. The memory select 17 receives timing, address, and control signals over bus 19 from the CPU 1 and system clock and generates timing and select signals for the RAM and ROS memories. For the RAM memory the memory select generates a card select signal (CPCS) on lines 253, 257 or 269 to select one of the three cards which contain the RAM memory, a chip select X signal (CSX) on lines 273, 277, 281, or 285 to select the X address of a chip on the selected cards, a chip select Y signal (CSY) on lines 289 or 293 to select the corresponding Y address for the selected chip and a write signal (CPWRT) 245 if the operation is write into RAM.

Figure 4:
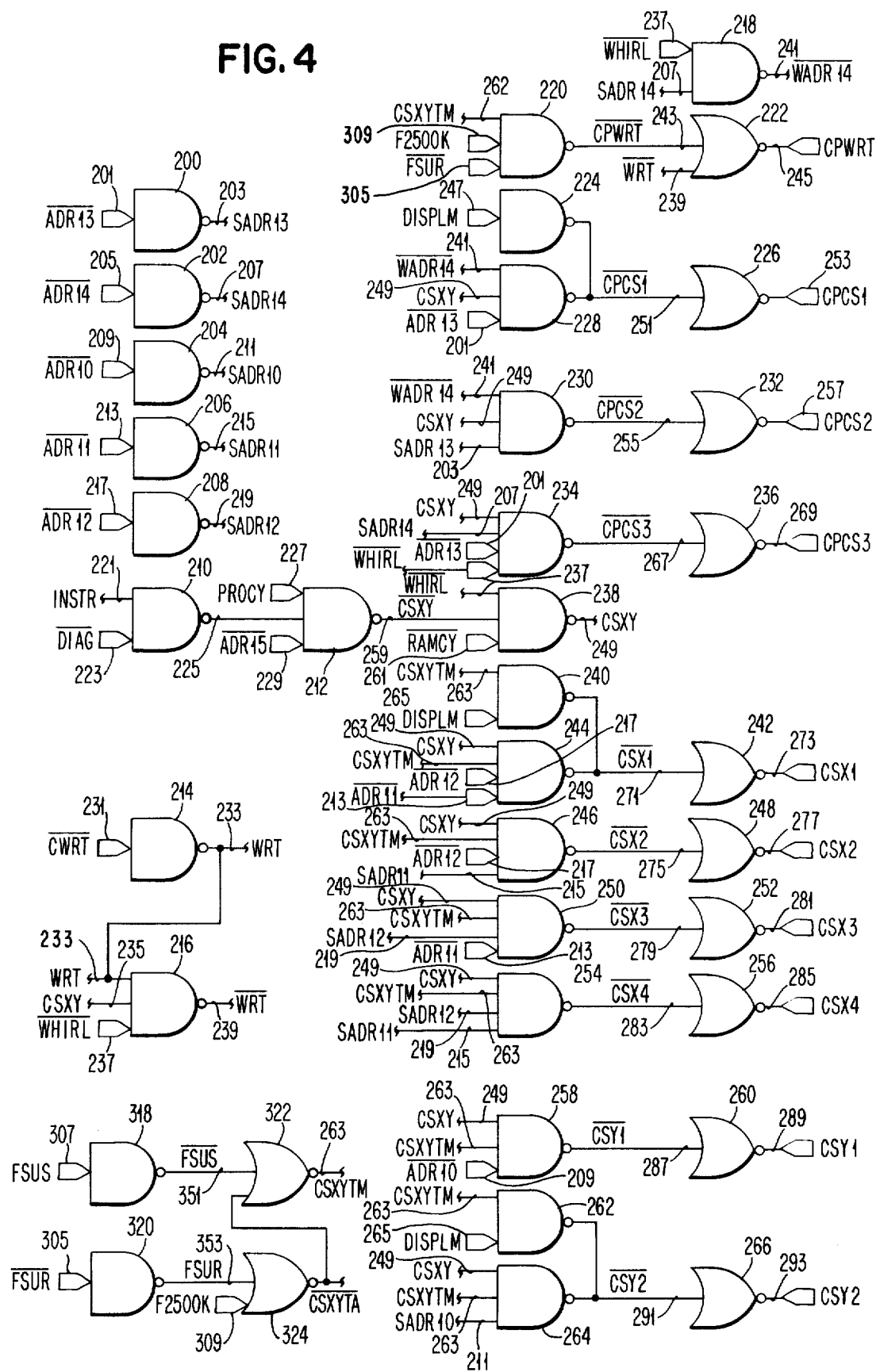
FIGS. 4, 5, 6 and 7 show the detailed logic of the memory select of FIG. 2.

Referring now to FIG. 4, card select is generated by the combination of address line 13 (ADR13) on input pin 201, instruction (INSTR) on input pin 399 (FIG. 6), WHIRL on input pin 237, address line 14 (ADR14) on input pin 205 and diagnostics (DIAG) on input pin 223. ADR13 is output from the processor and feeds into NAND gate 200 where it is inverted to produce SADR13 on line 203. ADR13 is also input to NAND gate 228 and 234. ADR14 is also output from the processor and is buffered by NAND gate 202 to produce SADR14 on line 207. INSTR is output from the processor on input pin 399 to and buffered by NAND gate 360 to produce INSTR on line 401. INSTR on line 221 and DIAG on line 223 drive NAND gate 210 to produce an inhibit signal on line 225 to inhibit RAM cycles during instruction fetches except when in the diagnostic mode. Normally instruction fetches are made from the ROM memory. This allows a program to be loaded and used to test out the system without disturbing the system program stored in ROM. The output of NAND gate 210 is combined with the processor cycle input (PROCY) on pin 227 and address line 15 (ADR15) on input pin 229 by NAND gate 212 to produce an enable signal $\overline{CSXY}$ for RAM memory. $\overline{CSXY}$ is inverted by NAND gate 238 to produce enable signal CSXY. NAND gate 238 is also driven by two external memory control signals $\overline{WHIRL}$ on input pin 237 and $\overline{RAMCY}$ on input pin 261. $\overline{WHIRL}$ and $\overline{RAMCY}$ permit access to RAM independent of the processor cycle request PROCY.

Each of the RAM cards may contain modules, each of which contains up to four chips depending on the amount of memory contained on that card. Address line 10 (ADR10) determines the Y component of the chip select, CSY1 or CSY2. The combination of address line 11 (ADR11) and address line 12 (ADR12) determines the X component of the chip CSX1, CSX2, CSX3 or CSX4.

The write signal CPWRT for the RAM is derived by the memory select from the processor signal $\overline{CWRT}$. $\overline{CWRT}$ is input to memory select on input pin 231 and buffered by NAND gate 214 to produce WRT on line 233. WRT is combined with the enable signal $\overline{CSXY}$ on line 235 and external memory control signal $\overline{WHIRL}$ on pin 237 by NAND gate 216 to produce $\overline{WRT}$. WHIRL inhibits writing into RAM during accesses to the RAM memory caused buy $\overline{WHIRL}$.

A timing strobe signal CSXYTM is generated for the RAM by the logic comprising NAND gates 318 and 320, NOR gate 322 and AND gate 324. The clock signal FSUS on pin 307 is shortened by the combination of timing signals FSUR on pin 305 and F2500K on pin 309. The result is a signal slightly shorter than FSUS. The strobe signal CSXYTM controls the timing of the chip select gates for the chip X and Y selects. CSXYTM is again shortened to produce write selection by combination with F2500K and $\overline{FSUR}$ in NAND gate 220 to produce $\overline{CPWRT}$. $\overline{CPWRT}$ is input to NOR gate 222 over line 243 to produce RAM write signal CPWRT on output pin 245 if the write function is not inhibited by external control $\overline{WHIRL}$.

ROS Selection

Memory select 17 in FIG. 1 generates the timing and control signals required to run the read only storage memory. The ROS memory is addressed in individual 8K byte blocks SI0K, SI8K, SI16K, . . . S56K.

Figure 7:
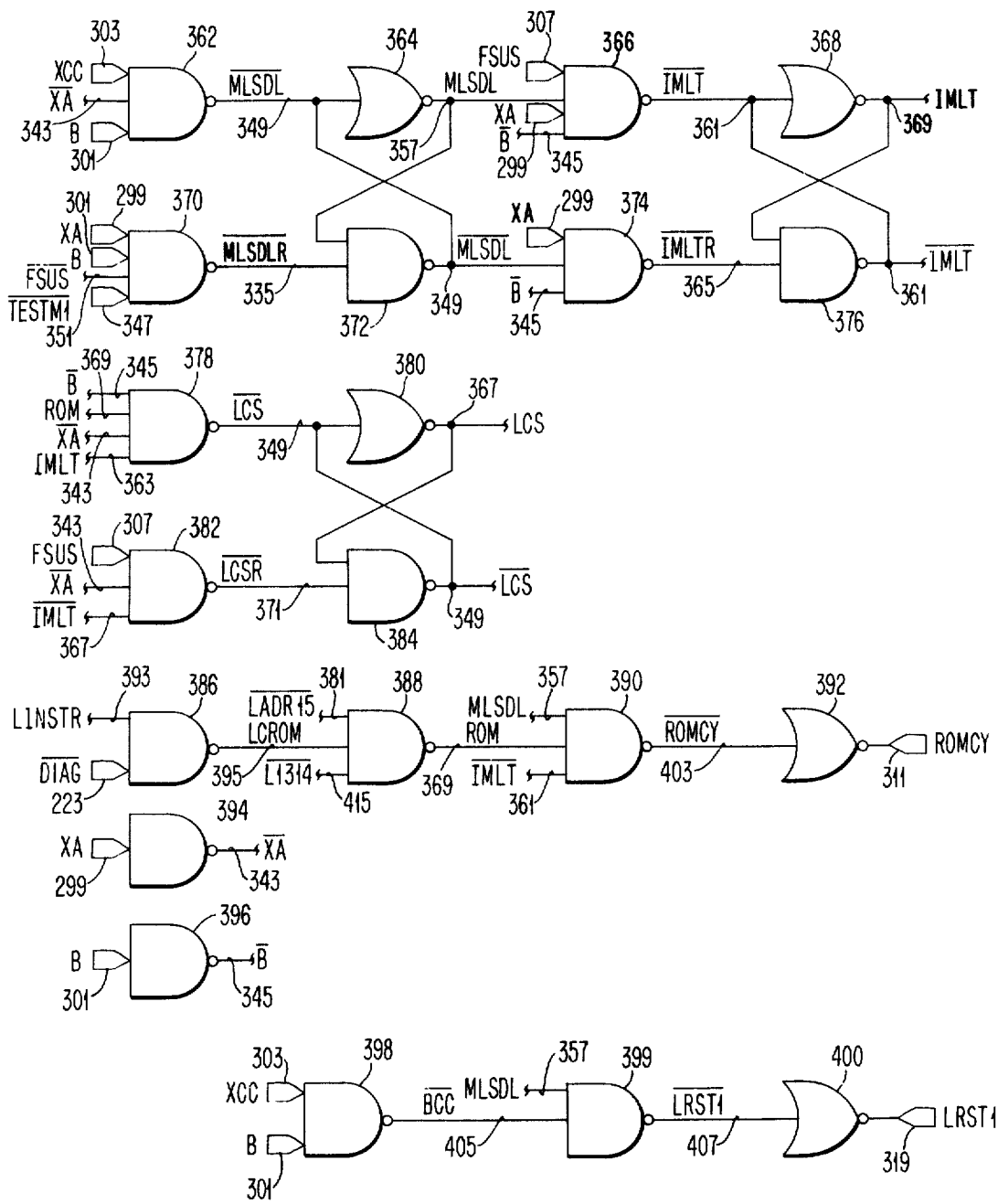

FIG. 7 shows the circuits which produce the selection signals LCS and LRST1 necessary to drive the ROS. These selection signals are derived by memory select from the system clock timing signals XA, B, XCC and FSUS. The signals XA, B and FSUS are free running signals whose frequency and relative skew ar designed to be multiples of the timing for the technology being used. in this case, LSI MOS. XCC defines the beginning of a cycle and corresponds to the processor's phase one. XA enters the memory select on input pin 299 and is buffered to produce $\overline{XA}$. Likewise, B enters the memory select on pin 301 and is buffered to produce $\overline{B}$. The series of latches provide a division of the system clock signals in order to produce the proper selection signal LCS for the ROS memory. Signals $\overline{XA}$ on line 343 and B on input pin 301 are free running and drive the inputs of NAND gate 362 which produces latch signal MLSDL at the output 357 of driver 364. The proper logical level at MLSDL is produced by the combination of $\overline{XA}$ and B with the cycle signal XCC on input pin 303. The latch is reset by signals $\overline{FSUS}$ on line 351, XA on line 299, and B on line 301, assuming the test input TESTMI is high.

MLSDL drives the input of NAND gate 366 and is combined with FSUS on input pin 307, XA on input pin 299, and $\overline{B}$ on line 345 to produce intermediate latch signal IMLT on line 368. MLSDL in combination with ROM controls the generation of ROMCY which enables the fan-in latch to be discussed below. MLSDL and IMLT NAND through gate 356 also control the generation of RAMT2 clock signal which enables the channel selects for fan-in. The intermediate latch is reset by XA, $\overline{B}$, and $\overline{MLSDL}$. The output IMLT of NOR gate 368 on line 369 drives the input of NAND gate 378 which controls the generation of the ROS chip select signal LCS on line 367. LCS is set by NAND gate 378 and NOR gate 380 using the combination B on line 345, ROM on line 369, $\overline{XA}$ on line 343 and IMLT on line 363. LCS is reset by FSUS, $\overline{XA}$, and $\overline{IMLT}$. ROM is generated in NAND gates 386 and 388 from the latched instruction signal LINSTR whose generation is discussed below. LCS is input to the drivers for all ROS memory chips and combined with the address selection signal to enable the proper chip, FIG. 5. The ROS chip is reset prior to chip select by LRSTI which is generated by XCC, B, and MLSDL in NAND gates 398 and 399.

Figure 6:
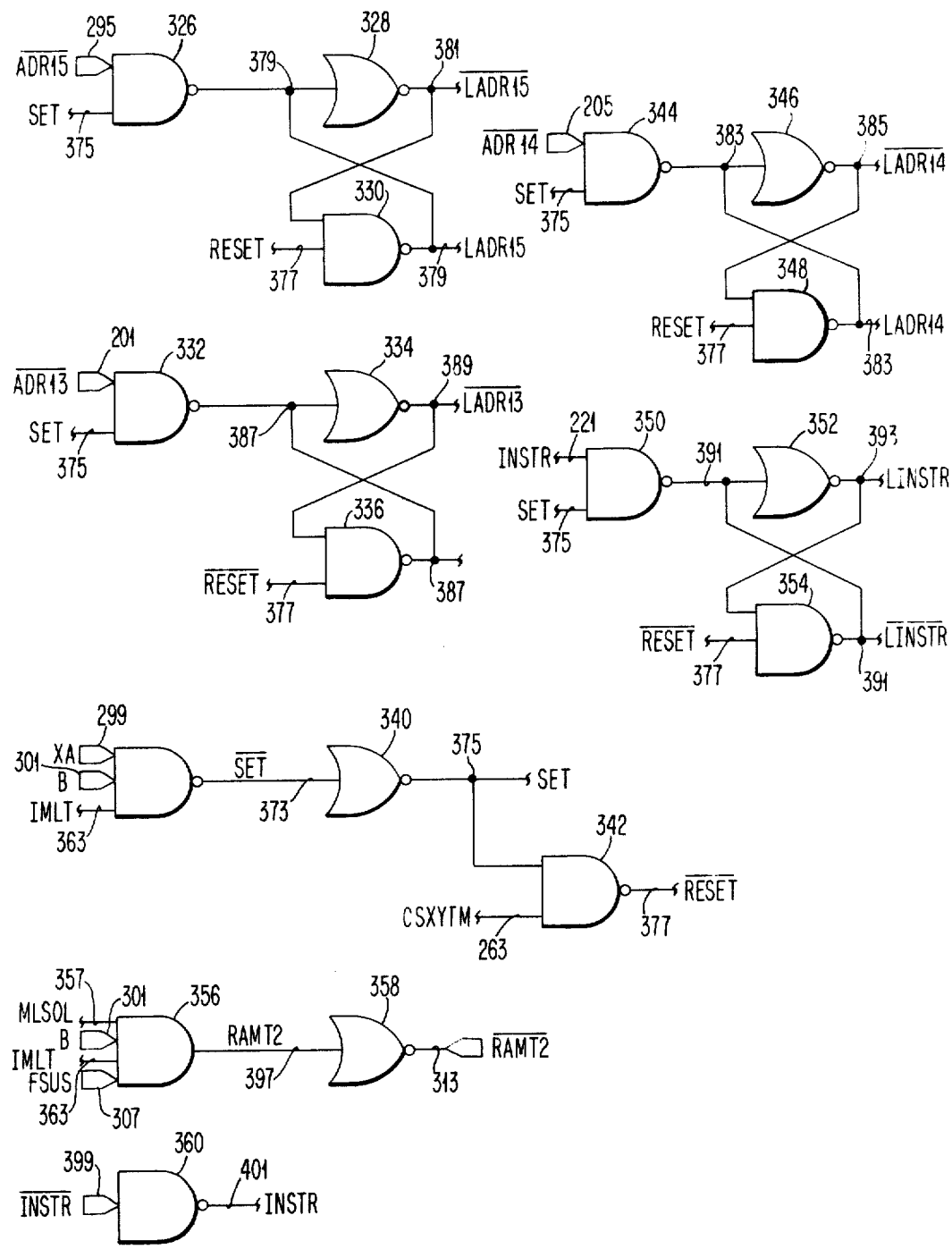

The address latches for ROS chip selection are shown in FIG. 6. The combination of address line 13 (ADR13) on line 201 from the CPU 1 into memory select 17, address line 14 on line 205, and address line 15 on line 295 in combination with $\overline{INSTR}$ determine which of the nine 8K byte chips will be selected. The signal INSTR on input pin 399 determines whether the command is an instruction or data. Referring to FIG. 6, INSTR enters NAND gate 360 on input pin 399 and is inverted to produce INSTR on line 401. INSTR is latched up by the latch comprising NAND gates 350 and 354 and NOR gate 352. The set signal for all the latches is produced by clock signals XA on pin 299 and B on pin 301 and the intermediate latch signal IMLT on line 363 from the ROS timing generator discussed above. The reset signal for the address latches and instruction latch is the SET anded with the RAM memory strobe signal CSXYTM. Address line 13 (ADR13) is latched up by the latch comprising NAND gates 332 and 336 and NOR gate 334. The signal address line 14 (ADR14) on input pin 205 is latched by the combination of NAND gates 344 and 348 and NOR gate 346 while the signal address line 15 (ADR15) on input pin 295 is latched by NAND gates 326 and 330 and NOR gate 328.

Figure 5:
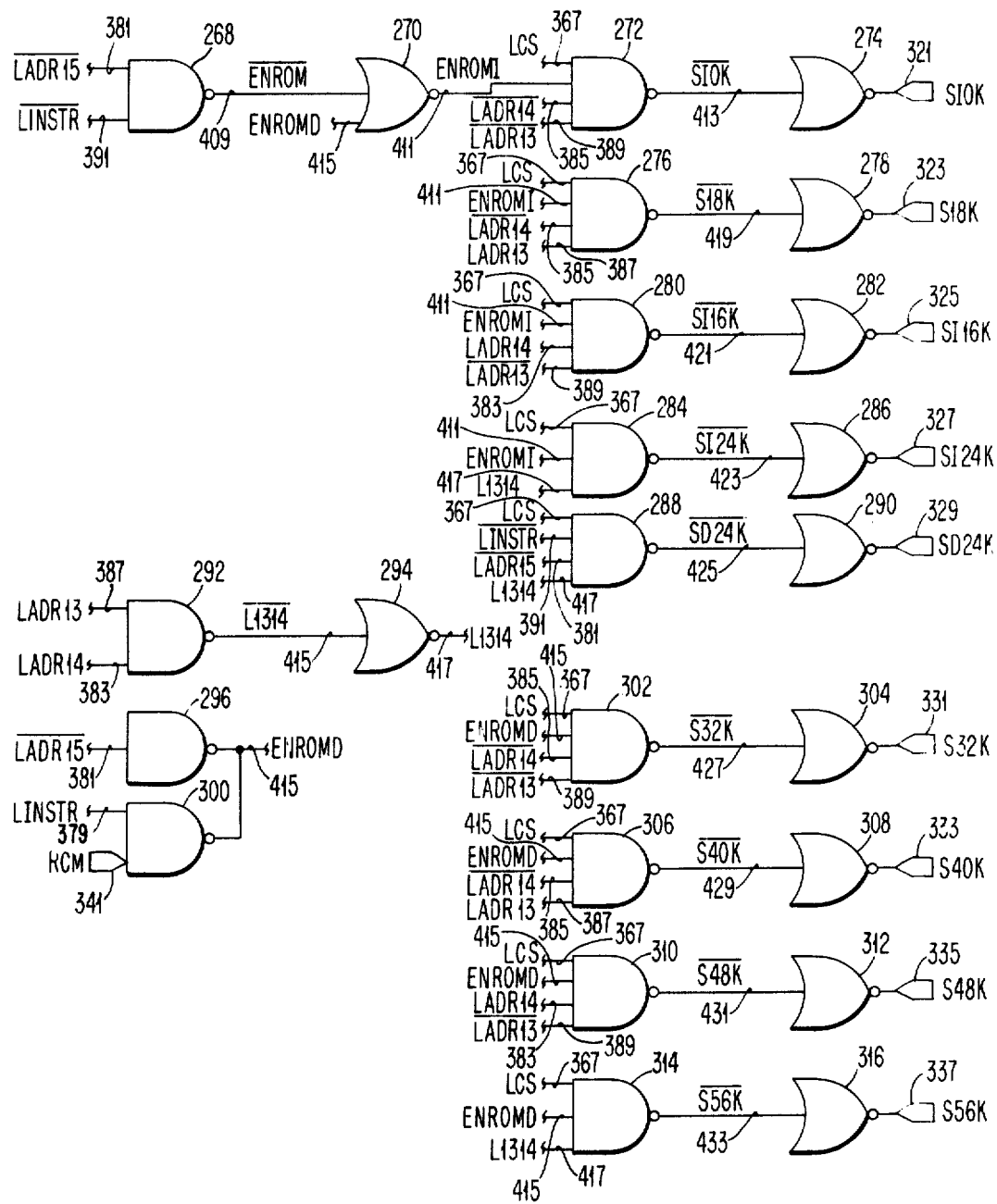

The latched address signals of FIG. 6 in combination with the chip select signal LCS of FIG. 7 control the ROS selection circuitry of FIG. 5. In the preferred embodiment the mini-processor has a basic 64K byte address space. In addition, it has an instruction output line, INSTR, on line 399 which has the following characteristics: it is driven low during instruction byte fetches and is driven high during indirect data fetches, register and byte fetches and I/O cycles. The $\overline{\text{INSTR}}$ line is used by the memory select to distinguish areas of the ROS memory as either data or instruction bytes. INSTR can also be used to expand the 64K byte processor address space to 96K bytes. This expansion takes place in the memory select providing 32K bytes of "instruction only" space, 32K bytes of "data only" space and 32K bytes of "mixed" memory space.

The memory select can address a maximum of 24K bytes of RAM leaving the remaining 72K bytes for ROS. By restricting the RAM to "data only", the ROS can be divided into 8K of "data only", 32K of "instruction only" and 32K of "mixed" data and instructions. Referring to FIG. 5, the first 32K bytes of ROS are addressable as instructions only. These are addressed by chip select lines SI0K, SI8K, SI16K and SI24K. Line SD24K addresses 8K of data only and lines S32K, S40K, S48K and S56K addresses 32K of mixed data and instructions. The latched instruction signal $\overline{\text{LINSTR}}$ on line 391 and low order address line $\overline{\text{LADR15}}$ on line 381 in combination with ENROMD generates ENROMI which controls accessing the 32K bytes of instructions through NAND gates 272, 276, 280 and 284. LINSTR controls the accessing of the 8K bytes of data only through NAND gate 288 and the combination of $\overline{\text{LADR15}}$ into NAND gate 296 and LINSTR and RCM into NAND gate 300 generates ENROMD on line 415 which controls accessing to the 32K bytes of mixed ROS through NAND gates 302, 306, 310 and 314 in addition to being used to generate ENROMI as described above.

The 32 K bytes of ROS which are designated as instruction only can normally not be accessed as data. However, the Cyclic Redundancy Check (CRC) error checking technique requires access to all ROS as data. In order to accommodate this requirement the signal ROS Check Mode (RCM) on input pin 341 has been included to allow access to the instruction only area as data. Thus it is possible to check the memories and detect errors in many instances before actually executing an instruction containing an error. RCM is entered by driving pin 341 high. This controls NAND gate 300 to produce a logical zero at ENROMD on line 415. ENROMD then controls NOR gate 270 in combination with $\overline{\text{ENROM}}$ to generate a ENROMI to gain access to instruction only ROS.

FAN-IN

Data output by the ROS and RAM memories to the processor is controlled by the system logic Fan-in. Referring to FIG. 1, Fan-in 18 is connected to the outputs of ROS by bus 4 and RAM by bus 5. Fan-in 18 receives control signals from memory select 17 over control line 22 and from the processor and systems clock over control line 23. The output 12 of Fan-in 18 is connected to the processor data-in bus 14. Fan-in serves as a data "funnel" to select data from the three memory output paths and place it on a single bus to the processor.

Figure 3:
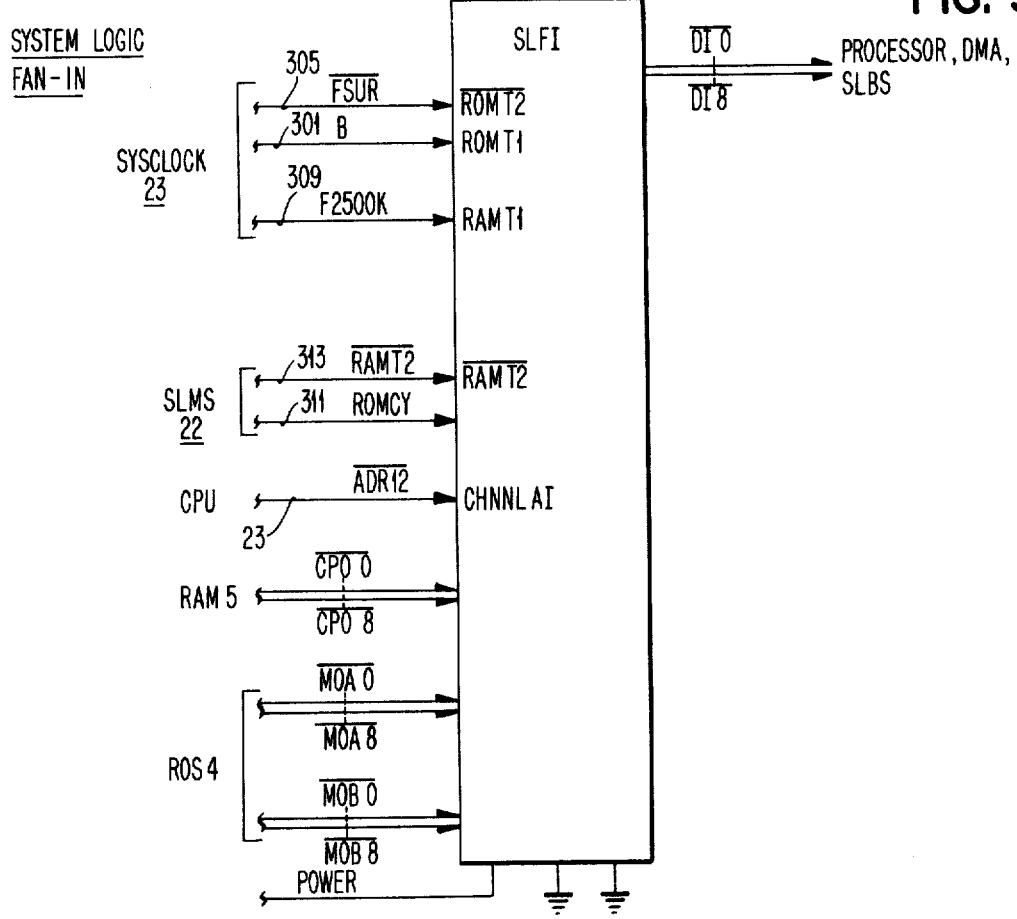
FIG. 3 is a block diagram of the fan-in portion of the invention showing its inputs and outputs in detail.

Referring to FIG. 3 a more detailed view of the inputs and output of the Fan-in is shown. The Fan-in has three input data paths, data bus 5 for the RAM memory and the two data buses 4 for the ROS. These data buses are each nine bits wide. Any one of three data paths can be selected as a function of the CPU control signal address line 12 ($\overline{\text{ADR12}}$) on control line 23 and memory select control line ROS cycle (ROMCY) on control line 311. ROMCY enables the ROS path and disables the RAM path while ADR12 selects the "A" or "B" channel of ROS data bus 4.

Figure 8:
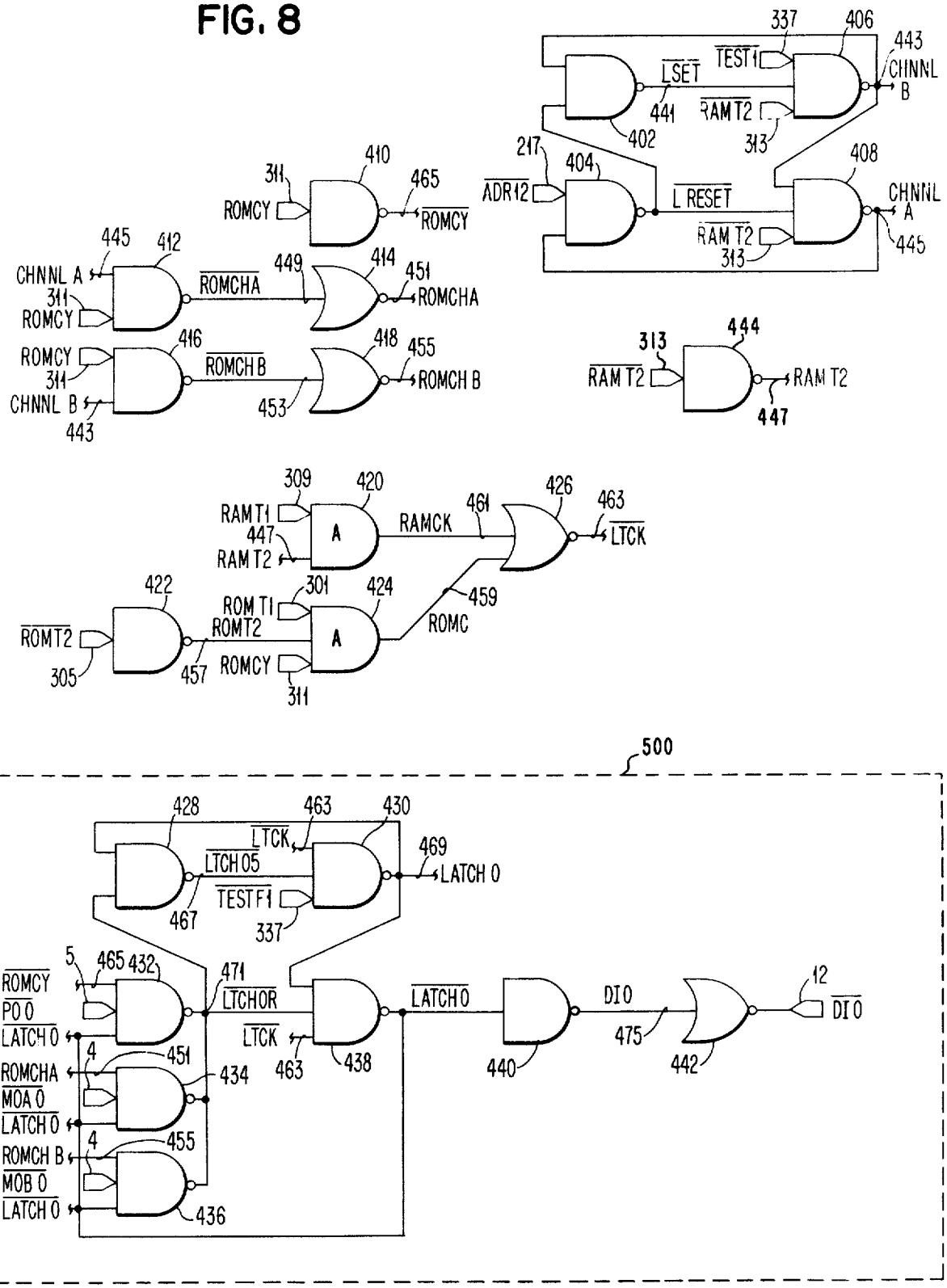
FIG. 8 shows the detailed logic of the fan-in apparatus of FIG. 3.

Referring now to FIG. 8, the Fan-in logic is shown in detail. $\overline{\text{ADR12}}$ enters NAND gate 404 on input pin 217 and is latched on the leading edge of timing signal $\overline{\text{RAMT2}}$ on input pin 313 to generate CHNNL A or its inverse CHNNL B. ROMCY combines with CHNNL A in NAND gate 412 and NOR gate 414 to produce ROMCHA on line 451 or with CHNNL B in NAND gate 416 and NOR gate 418 to produce ROMCHB on line 455. ROMCHA drives input 451 of data latch shown in the dashed box and enables latching of data from channel A of the ROS data bus 4. Latching of the data occurs at the rising edge of latch clock not signal $\overline{\text{LTCK}}$ on line 463 into NAND gate 430 and 438. $\overline{\text{LTCK}}$ is derived from two timing signals each for RAM and ROS: RAMT1 and $\overline{\text{RAMT2}}$ or ROMT1 and ROMT2. RAMT1 on input pin 309, ROMT1 on input pin 301 and ROMT2 on input pin 305 are free running timing signals generated by the system clock. $\overline{\text{RAMT2}}$ on input pin 313 is generated by the memory select along with read only store cycle signal ROMCY on input pin 311. The signal ROMCY or its inverse $\overline{\text{ROMCY}}$ controls Fan-in to sample data from the RAM or from one of the ROS channels. $\overline{\text{ROMT2}}$ on input pin 305 is inverted by NAND gate 422 to produce ROMT2. ROMT2 and ROMT1 on input pin 301 drive AND gate 424 whose gating is controlled by ROMCY. $\overline{\text{RAMT2}}$ is inverted by NAND gate 444 to produce RAMT2 on line 447. RAMT2 and RAMT1 drive AND gate 420. When both RAMT2 and RAMT1 are at logical one $\overline{\text{LTCK}}$ is at logical zero and the data latch is disengaged. RAM data will be latched on the next falling edge of RAMT1 when ROMCY is at logical zero. $\overline{\text{ROMCY}}$ will be at logical one on line 465 enabling NAND gate 432 and 428. When strobed by $\overline{\text{LTCK}}$ the RAM data will pass through NAND gates 438 and 440 to bus driver 442. Bus driver 442 passes the data onto data bus $\overline{\text{DIO}}$ to the processor. data latch The ROS memory is accessed when ROMCY is a logical one. Address line 12 $\overline{\text{ADR12}}$ on input pin 217 activates the channel selector to select either channel A or channel B. ROMCY on input pin 311 enables either NAND gate 412 or NAND gate 414 to activate the channel driver ROMCHA 451 or ROMCHB 455 for the selected channel. The selected channel driver enables gate 434 or 436 to pass data from ROS channel A MOAO or ROS channel B MOBO respectively. The data is sampled by the data latch comprising NAND gates 428, 430 and 438 and enables NAND gate 440 to drive bus driver 442 and place the data on the bus 12 to the processor during the next processor cycle.

OPERATION

Referring now to FIGS. 2 and 4 assume that the processor initiates an access to the RAM section of memory 2. The processor instruction command $\overline{\text{INSTR}}$ is issued to the memory select 17 on input pin 399. If INSTR is a logical zero the command is an instruction command or if $\overline{\text{INSTR}}$ is a logical one the command is a data command. Only data is stored in the RAM. $\overline{\text{INSTR}}$ is inverted by NAND gate 360 in FIG. 6 to produce INSTR on line 401. INSTR drives NAND gate 210 if the gate is not inhibited by $\overline{\text{DIAG}}$ indicating that system diagnostics are being performed. The processor also issues its cycle command PROCY on memory select input pin 227. PROCY and $\overline{\text{INSTR}}$ are combined by NAND gate 212 with address line signal ADR15 on input pin 229 to produce the inverse $\overline{\text{CSXY}}$ of the chip selection signal. $\overline{\text{CSXY}}$ drives NAND gate 238 to produce the RAM enable signal CSXY. The NAND gate 238 is controlled by $\overline{\text{WHIRL}}$ on line 237 and $\overline{\text{RAMCY}}$ on input pin 259 which are at logical one when the RAM is addressed by the processor. The signals WHIRL and $\overline{\text{RAMCY}}$ permit access to a portion of the RAM memory by other devices external to the processor, thus, permitting the RAM to be used as a storage device for I/O devices such as printers and displays.

The RAM enable signal CSXY on line 249 is distributed to all the chip select gates. In the preferred embodiment, the RAM memory is located on three integrated circuit cards, each containing up to 8K bytes. A card select signal CPCS is generated by the memory select in response to processor signals on address line 13, ADR13, and address line 14, ADR14. ADR13 on input pin 201 is inverted by NAND gate 200 to produce SADR13 on line 203 and $\overline{\text{ADR14}}$ on input pin 205 is inverted by NAND gate 202 to produce SADR14 on line 207. RAM memory card number one, CPCS1, is selected when both ADR13 and $\overline{\text{ADR14}}$ are at logical one. $\overline{\text{ADR14}}$ drives NAND gate 202 and 218 to produce $\overline{\text{WADR14}}$. NAND gate 218 is controlled by the external device control signal $\overline{\text{WHIRL}}$ on input pin 237 which is at logical one during a processor cycle. $\overline{\text{WADR14}}$ on line 241 and ADR13 on input 201 are combined by NAND gate 228 to produce CPCS1. NAND gate 228 is enabled by the chip enable signal CSXY on line 249. The output of NAND gate 228 is dotted with the output of NAND gate 224. NAND gate 224 is driven by signal DISPLM on input pin 247 which enables an external display device to use the memory located on card number one as its data source. $\overline{\text{CPCS1}}$ on line 251 drives bus driver 226 to place a card select signal CPCS1 on output pin 253. Memory cards 2 and 3 are selected in substantially the same manner with ADR13 equal to a logical zero and $\overline{\text{ADR14}}$ equal to a logical one for the selection of memory card number two and ADR13 equal to a logical one and $\overline{\text{ADR14}}$ equal to a logical zero for the selection of memory card number three.

Once the proper card has been selected, the memory select next generates signals to select the proper X and Y coordinates for the addressed memory on the selected card. The X address selection signal is generated by the memory select using the signals on the processor address line ADR11 on input pin 213 and ADR12 on input pin 217. In the preferred embodiment each module on the three circuit cards can hold up to four integrated circuit chips. The X and Y select signals enable the proper one of the four chips located on the card. Each card has four X select lines and two Y select lines. The chip is selected which is located at the intersection of the X and Y select lines. The four X select signals are combined with the first Y select signal to select one of the first two chips and are combined with the second Y select signal to select the other two chips.

The first X select signal, CSX1, on onput pin 273 is enabled when both ADR11 and ADR12 are at logical one. ADR11 on input pin 213 and ADR12 on input pin 217 drive NAND gate 244 to produce $\overline{\text{CXS1}}$ on line 271. NAND gate 244 is enabled by the combination of chip select signal CSXY on line 249 and timing signal CSXYTM on line 263. CSXYTM is the memory strobe signal generated by memory select in NAND gates 318 and 320 and NOR gates 322 and 324 from free running input signal FSUS on input pin 307 and $\overline{\text{FSUR}}$ on input pin 305 and F2500K on input pin 309. The output of NAND gate 244 is dotted with the output of NAND gate 240. NAND gate 240 is controlled by the strobe timing signal CSXYTM and the display signal DISPLM which allows an external display device to enable the X select signal CSX1.

The X select signals CSX2, CSX3, CSX4 are generated in the same manner as CSX1 using a different combination of logical ones and zeros for $\overline{\text{ADR11}}$ and $\overline{\text{ADR12}}$. Chip select signal CSX2 is a logical one when $\overline{\text{ADR11}}$ is logical zero and $\overline{\text{ADR12}}$ is logical one. X chip select signal CSX3 is logical one when $\overline{\text{ADR11}}$ is a logical one and ADR12 is a logical zero. X chip select signal CSX4 is a logical one when $\overline{\text{ADR11}}$ is a zero and $\overline{\text{ADR12}}$ is a logical zero.

The Y component of the chip select signal is generated by processor address line ADR10. Y select signal CSY1 is a logical one when ADR10 is a logical one. ADR10 drives NAND gate 258 on input pin 209 to produce $\overline{\text{CSY1}}$ on line 287. NAND gate 258 is enabled by chip select signal CSXY on line 249 and timing strobe signal CSXYTM on line 263. $\overline{\text{CSY1}}$ which is a logical zero is inverted by line driver 260 to produce a logical one for CSY1 on output pin 289.

The second Y select signal CSY2 on output pin 293 is a logical one when $\overline{\text{ADR10}}$ is a logical zero. CSY2 is determined by NAND gate 264 and line driver 266. The output of NAND gate 264 is dotted with the output of NAND gate 262. NAND gate 262 is controlled by external display DISPLM on input pin 265 and timing strobe signal CSXYTM on line 263 so that CSY2 may be enabled by an external display device. Recall that CSX1 could also be enabled by an external display device. Therefore, the combination of CSX1 and CSY2 may enable an external display device to select the chip at the intersection of these two signals.

Corresponding with the chip select signal, a signal must be generated to determine whether the operation is to be a read or write into the memory. This signal is $\overline{\text{CWRT}}$ which is output from the processor to the memory select on input pin 231. When $\overline{\text{CWRT}}$ is a logical one, the instruction is a write into memory. $\overline{\text{CWRT}}$ is inverted by NAND gate 214 to produce WRT on line 233. This signal occurs while the timing strobe CSXYTM and free running clock signals F2500K and $\overline{\text{FSUR}}$ are at logical one. These signals feed NAND gate 220 to produce signal $\overline{\text{CPWRT}}$ on line 243. WRT on line 233 feeds NAND gate 216 which is controlled by the chip select signal CSXY on line 235 and external device signal $\overline{\text{WHIRL}}$ on input pin 237. $\overline{\text{WHIRL}}$ controls this block because the external devices, except those that use $\overline{\text{RAMCY}}$, are not permitted to write into memory, but only to read from memory. Since the operation is a processor write, then $\overline{\text{WRT}}$ on line 239 will enable line driver 222 and pass the signal CPWRT on output pin 245 to the memory. For a memory read, processor output signal $\overline{\text{CWRT}}$ is a logical zero.

Referring now to FIGS. 5, 6, and 7, the operation of the read only storage selection circuitry will be discussed. The memory select generates the timing and control signals required to address the ROS. In the preferred embodiment, the ROS comprises 72K bytes of storage and is addressed in individual 8K byte blocks.

First 32K bytes are designated as containing instructions only and are addressed by SI0K, S(8K, SI16K, and S124K. The next 8K bytes, SD24K, are SI8K as containing data only, and the next 32K bytes, S32K, S40K, S48K, and S56K contain mixed data and instructions.

The timing signals necessary to run the ROS memory are generated by the logic in FIG. 7. A series of latches whose outputs are MLSDL, IMLT, and LCS, generate the timing signals from the free running clock signals XCC, XA, B, and FSUS output from the system clock. LSC is the chip select signal for the ROS and is input to each of the 8K byte block selection gates shown in FIG. 5. Instruction signal ENROMI on line 411 and ENROMD on line 415 determine whether the access to ROS is for data or instructions and correspondingly which section of the ROS memory may be addressed. Within the selected section, address signals ADR13 and ADR14 determine which of the 8K byte blocks is to be selected.

Referring to FIG. 6, address signal ADR13 sets the address latch comprised of NAND gates 332 and 336 and OR gate 334 to produce the latched address signal LADR13 on line 389. Corrspondingly, address signal 14, ADR14, is latched by the latch comprising NAND gates 344 and 348 and NOR gate 346 to produce LADR14 on line 385. These two signals are input to each of the ROS selection gates 272, 276, 280, 284, 288, 302, 306, 310 and 314 shown in FIG. 5. By selecting the proper combination of logical ones and zeros for these two signals along with the ROS chip select signal LCS, and the enabled ROS data signal ENROMD, or the enabled ROS instruction signal ENROMI, the proper 8k byte block on the ROS memory can be selected. The ROS data signal and ROS instruction signal are derived from the combination of the processor address line 15, ADR15, and the processor instruction signal INSTR. If the instruction signal INSTR is a logical one, then the data section of the ROS is addressed, while if the signal is a logical zero, the instruction section of the ROS is addressed.

Data is output from the RAM section of the memory on data bus 5 and is output from the ROS section on either channel A or channel B of data bus 4. Both data buses 4 and 5 are input to system logic fan-in 18 which serves as a data "funnel" to select data from the three output memory buses and place it on a single bus to the processor.

The memory select generates two signals, RAMT2 on line 313 and ROMCY on line 311 which control the operation of the fan-in. Timing for the fan-in is derived from the clock signals FSUR, B and F2500K. In FIG. 8, if the output is from the RAM section of the memory, then RAMT2 will be a logical zero making its inverse RAMT2 a logical one. RAMT2 on line 447 drives AND gate 420 in combination with timing signal RAMT1 on input pin 309 to set the fan-in data latch signal LTCK at the output of NOR gate 426 on line 463. Since the data output is from the RAM, the other control signal from the memory select, ROMCY on fan-in input pin 311 will be a logical zero and its inverse ROMCY on line 465 will be a logical one. ROMCy controls the operation of NAND gate 432 to gate data from the RAM memory on input pin 5 into the data ltch 500. The output of the data latch drives bus driver 442 to place the data on bus 12 to the processor. If data is being output from the ROS section of the memory 2, then ROMCY will be a logical one and RAMT2 will also be a logical one. RAMT2 on input pin 313 clocks the channel selector to select either channel A on line 445 or channel B on line 443 of the ROS output. The logical condition of address line 12, ADR12, on input pin 217 determines whether channel A or channel B is selected. The selected channel together with ROMCY which is a logical one controls either NAND gate 412 or 416 to enable the proper channel driver 414 or 148. If channel A is selected, then signal ROMCHA on line 451 will be a logical one. This signal enables NAND gate 434 to gate data from output channel MOA0 of the ROS to the data latch 500. The output of the data latch drives bus driver 442 to place the data on data bus 12 to the processor.

If channel B is selected then signal ROMCHB on line 455 will be a logical one. This signal enables NAND gate 436 to pass data on input pin MOB0 into the data latch 500. This data is likewise passed through the data latch to bus driver 442 and onto the data bus 12 to the processor.

While the preferred embodiment of the invention has been described with reference to a particular form of logic it would be appreciated by those of skill in the art that other forms of combinational logic may be used to implement the invention without departing from the spirit and scope of the invention.

I claim:

1. In a word processing system including a pipelined processor having an input bus, a system clock, and an output bus, and including a plurality of random access memory blocks and a plurality of read only storage memory blocks, said random access memory blocks and said read only storage memory blocks having different operating characteristics, a memory control system interconnected to said processor and said memory blocks for controlling access to the memory blocks by the processor, wherein the memory control system comprises:
   means for receiving clock signals from said processor;
   means responsive to said clock signals for generating memory cycle timing signals having a plurality of frequencies required to operate said memory blocks;
   means for receiving an address and an instruction from said processor;
   decoding means responsive to said address and instruction for generating and applying power selection signals and one of said memory cycle timing signals only to the memory block which contains the address equivalent to the address received from said processor; and
   sampling means for latching the output of the selected memory block onto the input bus to the processor concurrent with the receipt of the next address and instruction from the processor.

2. The memory control system of claim 1 including latching means for expanding the total memory space addressable by the processor by decoding the processor's instruction as an address.

3. The memory control system of claim 1 further including external access means for inhibiting access by said processor to selected ones of said memory blocks and enabling access to said selected ones of said memory blocks by devices independent of said processor.

4. The memory control system of claim 1 further including signal means for defining said random access memory blocks as instruction space to permit diagnostic programs to be executed from said random access memory blocks.

5. The memory control system of claim 1 further including signal means for defining said read only storage memory blocks as data space to permit cyclic redundancy checking of the contents thereof for error.

* * * * *